July 8, 1952    W. E. BAKER    2,602,268
COMBINATION PLANT FLAT AND PLANT
PROPAGATING POTS THEREIN
Filed May 5, 1951
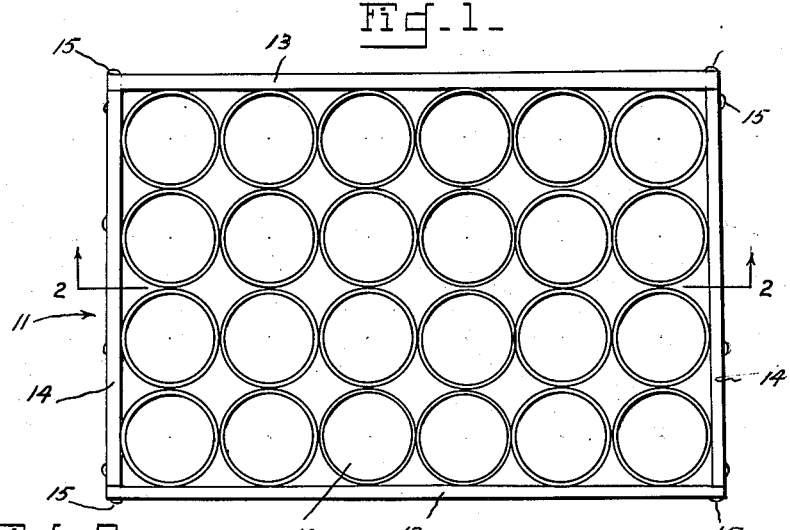
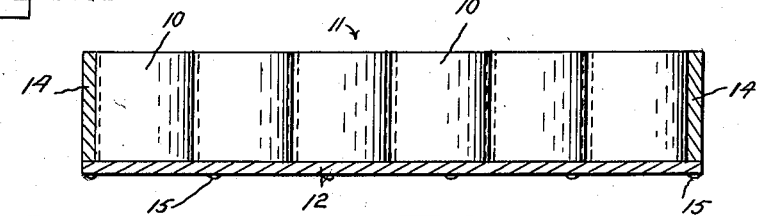
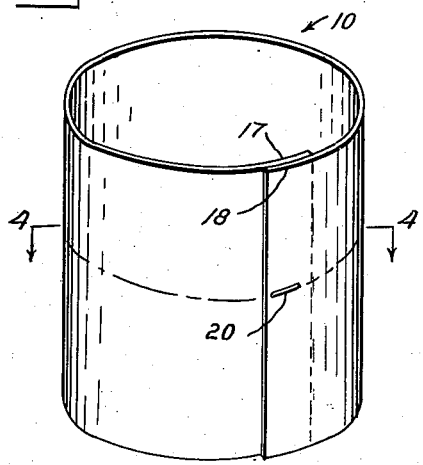
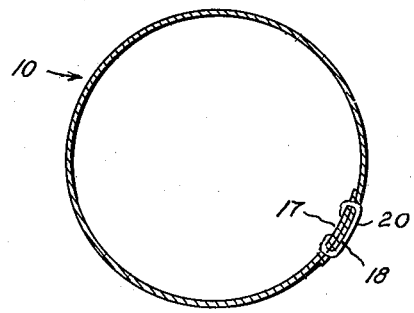
INVENTOR
Walter E. Baker,
BY *Gustave Miller*
ATTORNEY Patented July 8, 1952

2,602,268

UNITED STATES PATENT OFFICE 2,602,268

COMBINATION PLANT FLAT AND PLANT PROPAGATING POTS THEREIN

Walter E. Baker, Port Norris, N. J.

Application May 5, 1951, Serial No. 224,686

1 Claim. (Cl. 47—37)

This invention relates to a combination plant flat and plant propagating pots therein, and has for an object to provide an improved combination plant flat and pots especially intended for use in greenhouses and the like for germinating seeds and starting plants and thereafter readily separating individual pots from the plant flat for transplanting the plants therein.

A further object of this invention is to provide a combination plant flat and plant pots wherein the plant pots consist of a number of cylindrical paper pots whose total added diameters are greater than the inside measurements of the plant flat box, both lengthwise and breadthwise, whereby the plant pots are first placed empty in the plant flat box, and then filled with soil and the seed placed therein, the plant pots thus being pushed somewhat out of round, but held firmly therein by the contact with each other and with the sides of the plant flat without danger of bursting the pots, yet the pots are sufficiently spaced from each other so that air and moisture can reach the bottom thereof as needed by the plants germinating therein.

Still a further object of this invention is to provide a plant flat consisting of a box-like member, having its long sides nailed over the ends of its short sides, whereby one long side may be readily removed by withdrawing the nails or pulling out the side, thus providing access to the outermost row of plant pots and progressively to all the remaining plant pots in the flat.

A further object of this invention is to provide a paper plant pot formed of a rectangular piece of paper rolled into a cylinder and held by a staple midway through overlapping edges thereof, the paper from which the pot is being formed being free of wax, tar or other materials that might be harmful or injurious to the seed or the plant to be grown therein.

With the foregoing and other objects in view, as will hereinafter become apparent, this invention comprises the combination, constructions, and arrangement of parts hereinafter set forth, claimed and disclosed in the accompanying drawings, wherein:

Fig. 1 is a top plan view of the combination plant flat and plant pots of this invention;

Fig. 2 is a sectional view on lines 2—2 of Fig. 1;

Fig. 3 is a perspective view of an individual plant pot; and

Fig. 4 is a sectional view on line 4—4 of Fig. 1.

The combination plant flat and plant pots of this invention, as shown in the drawings, consists of one plant flat and a plurality of plant pots have here shown as 24 in number, extending six rows in the long direction and four rows in the breadthwise direction. The combination plant flat and plant pots 10 consists of a plant flat 11 made up of a rectangular flat bottom 12 having long vertically upstanding sides 13 extending to the ends of the long sides of the flat 11 and suitably secured thereto. Extending between the long sides 13 are the short sides 14, the short sides 14 being likewise suitably secured along the edges of the flat bottom 12, and additionally secured by nails 15 which extend through the very ends of the long sides 13 into the edges of the short sides 14 as shown. Arranged to be placed within the box provided by the flat 11 are a plurality of plant pots 10. Each plant pot 10 is made up of a single piece of paper, rectangular in outline, which is rolled into a cylinder, so as to have overlapping ends 17 and 18 of sufficient overlap so as to receive a fastener staple 20 therethrough midway between the top and bottom of the cylinder.

The preferred height of the plant pot 10 is three inches and its preferred diameter is two-and-three-quarters inches, and with such dimensions, the dimensions of the plant flat 11 should likewise be three inches high on its inside measurement, sixteen inches long on its inside length dimension, and ten-and-one-half inches wide on its inside breadth dimension. While these dimensions may be varied somewhat, of course, they should maintain substantially the same proportions as these dimensions do whereby the total added diameters of the four rows of plant pots is somewhat greater than the total inside breadthwise dimension and the total added diameters of the six lengthwise rows of plant pots is slightly larger than the lengthwise inside dimension of the plant flat. As a result of this relative proportion between the size of the plant pots and the plant flat, and as a result of the plant pots being made of paper and hence somewhat flexible, the plant pots are placed in empty condition within the plant flat, the cylinders yielding somewhat out of round as the last pots are placed therein, thus enabling all the pots to be placed in the plant flat. Then with the plant pots already in position within the plant flat, they may be filled with suitable soil and the seed planted therein so as to germinate in a hothouse or the like. As thus packed with soil, each plant pot tends to support the sides of the adjacent plant pots and the sides of the flats tend to support the adjacent sides of the adjacent plant pots, all without danger of bursting any of the pots, and still leaving ample room between the pots and the sides of the plant flat, as well as between each other for air or moisture to circulate thereabout and reach the soil and the seed and plant therein. After the plant has grown sufficiently, and it is desired to transplant the plants therefrom to the ground, one of the sides 13 may be removed from the plant flat 11, by pulling out the securing nails 15 from its adjacent edges of plant flat sides, thereby making the end long row of plant pots available for easy removal, and, of course, after these pots in the end row are removed, the pots in the adjacent rows can likewise be progressively easily emoved. Due to the pot being of paper, the plant pot, paper and all, may be placed in the ground in transplanting the plant, or if desired, they may be placed in a suitable hole in the ground, the staple may be loosened, then dirt may be packed around the plant pot with the plant therein, and then, the staple having been loosened, the paper of the plant pot may be easily slid out of the ground without disturbing the soil or the plant growing therein.

There is thus provided an improved plant flat and plant pots of very inexpensive construction which may be easily handled and used for planting and germinating seeds in a greenhouse and then readily transplated either directly to a garden for transplanting the individual plants, or to a store for sale of the individual plants in their individual pots and removed therefrom one by one as the plants are sold to customers to take home and plant in their own gardens.

While the device has been shown and the structure described in detail, it is obvious that this invention is not to be considered as being limited to the exact form disclosed, and that changes in detail and construction may be made therein within the scope of what is claimed, without departing from the spirit of this invention.

Having thus set forth and disclosed the nature of this invention, what is claimed is:

In combination, a plant flat and plant propagating pots therein, said plant flat comprising a rectangular box having a flat rectangular bottom, upstanding side members secured along the outer upper edges of the long sides of said flat bottom and extending to the ends thereof, upstanding end members secured along the outer upper edges of the short sides of said flat bottom and also secured between the vertical ends of the opposite upstanding side members, and a plurality of plant propagating pots each comprising a rectangular paper member rolled into a cylinder and secured as a cylinder by a staple midway the height thereof extending through overlapping vertical edges, the heights of said cylinders and the inside height of said plant flat box being substantially identical, the total inside length of said plant flat box being somewhat less than the total of the added diameters of the pot cylinders extending lengthwise therein, the total inside width of said plant flat box being also somewhat less than the total of the added diameters of the pot cylinders extending breadthwise therein, whereby when said pot cylinders are placed in the box and then filled with soil, said cylinders fit snugly within said plant flat box and hold and reinforce each other, and whereby one long side of said flat may be removed to permit said plant pots to be removed therefrom as desired, there being six rows lengthwise and four rows breadthwise of said pots in said flat.

WALTER E. BAKER.

REFERENCES CITED

The following references are of record in the file of this patent:

UNITED STATES PATENTS

| Number | Name | Date |
|---|---|---|
| 434,780 | Hescox | Aug. 19, 1890 |
| 668,518 | Higham | Feb. 19, 1901 |
| 1,104,719 | Tucker | July 21, 1914 |
| 1,200,396 | Southard | Oct. 3, 1916 |
| 2,046,236 | Ball | June 30, 1936 |
| 2,340,373 | Gardner | Feb. 1, 1944 |